United States Patent Office 2,765,101
Patented Oct. 2, 1956

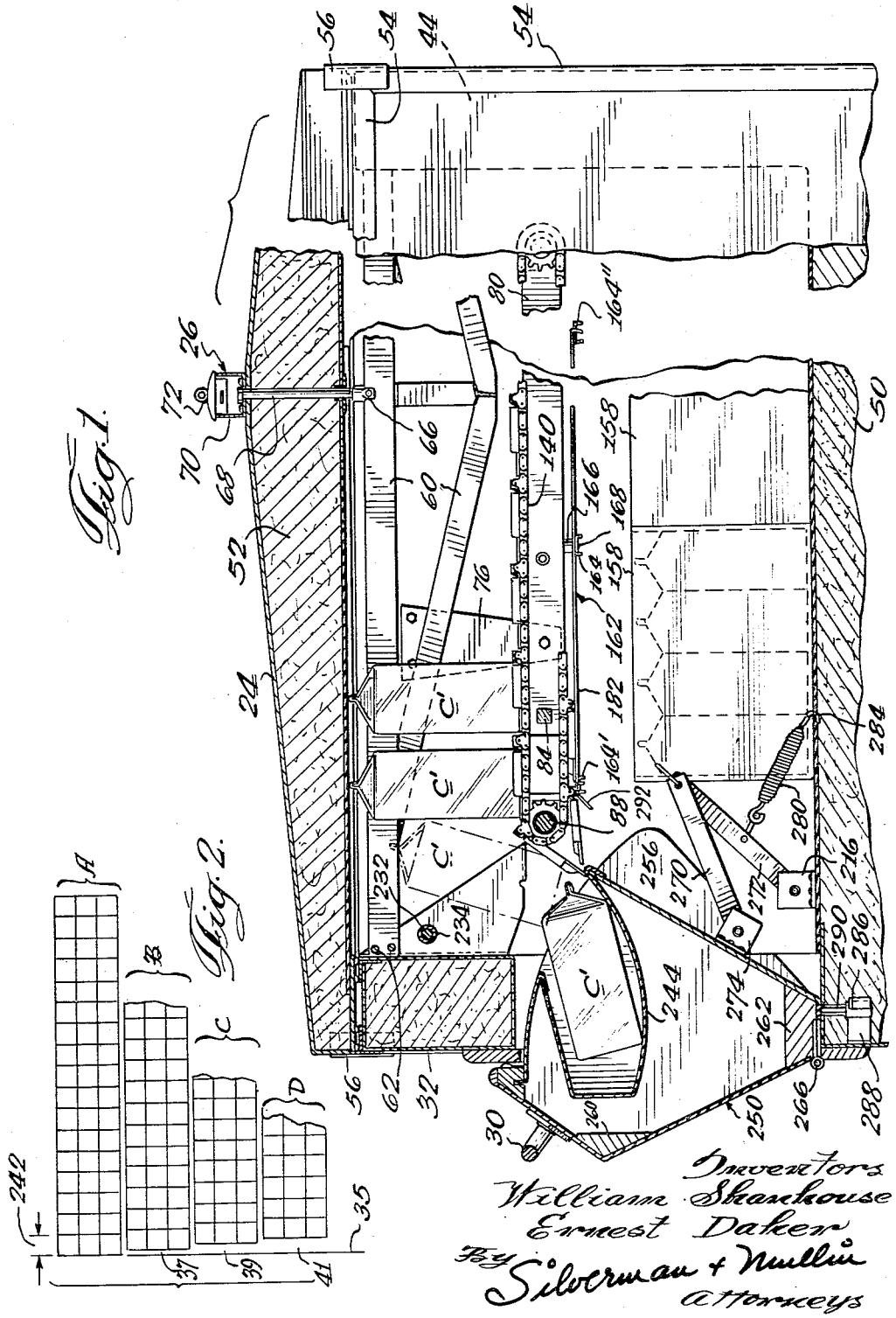

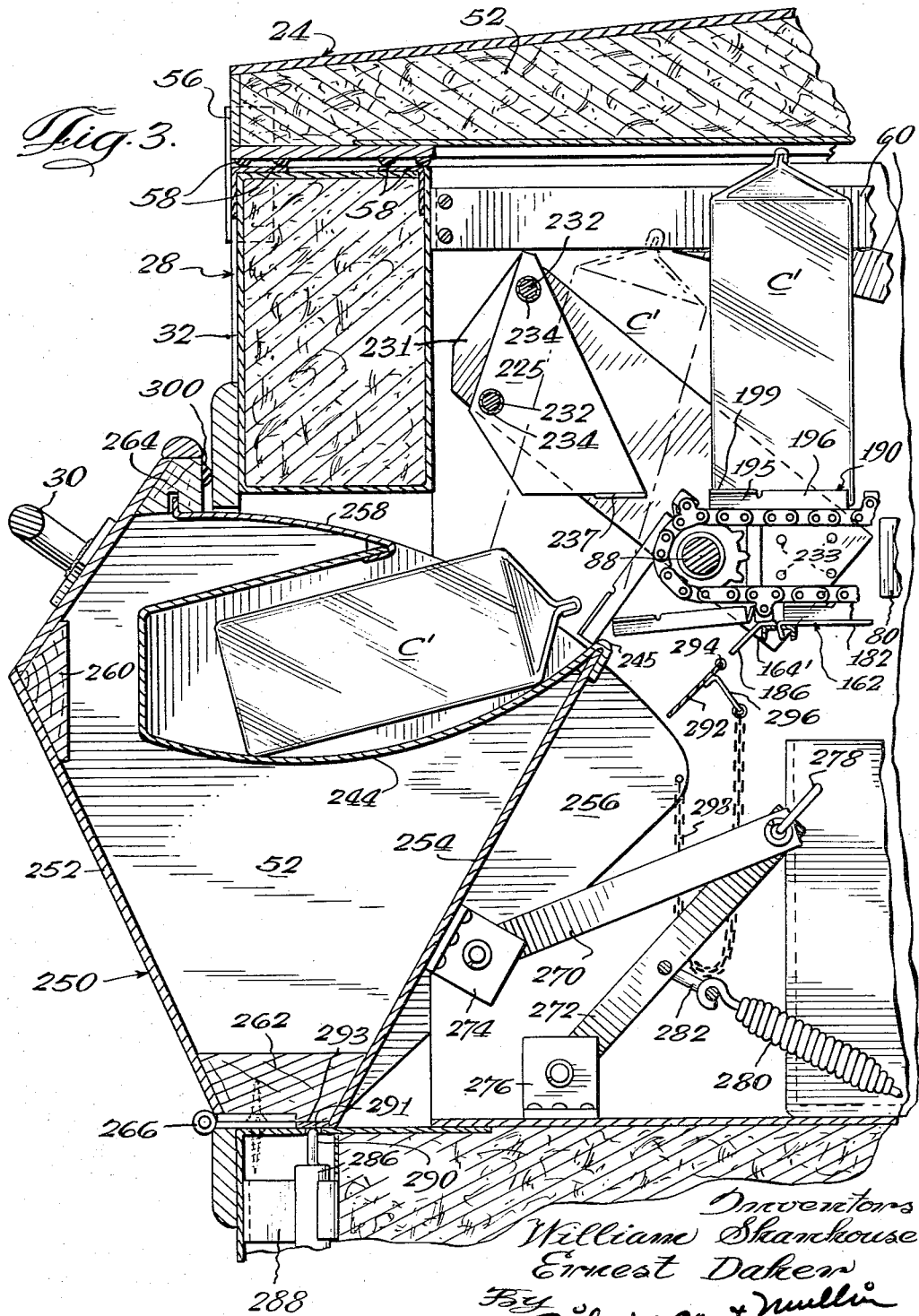

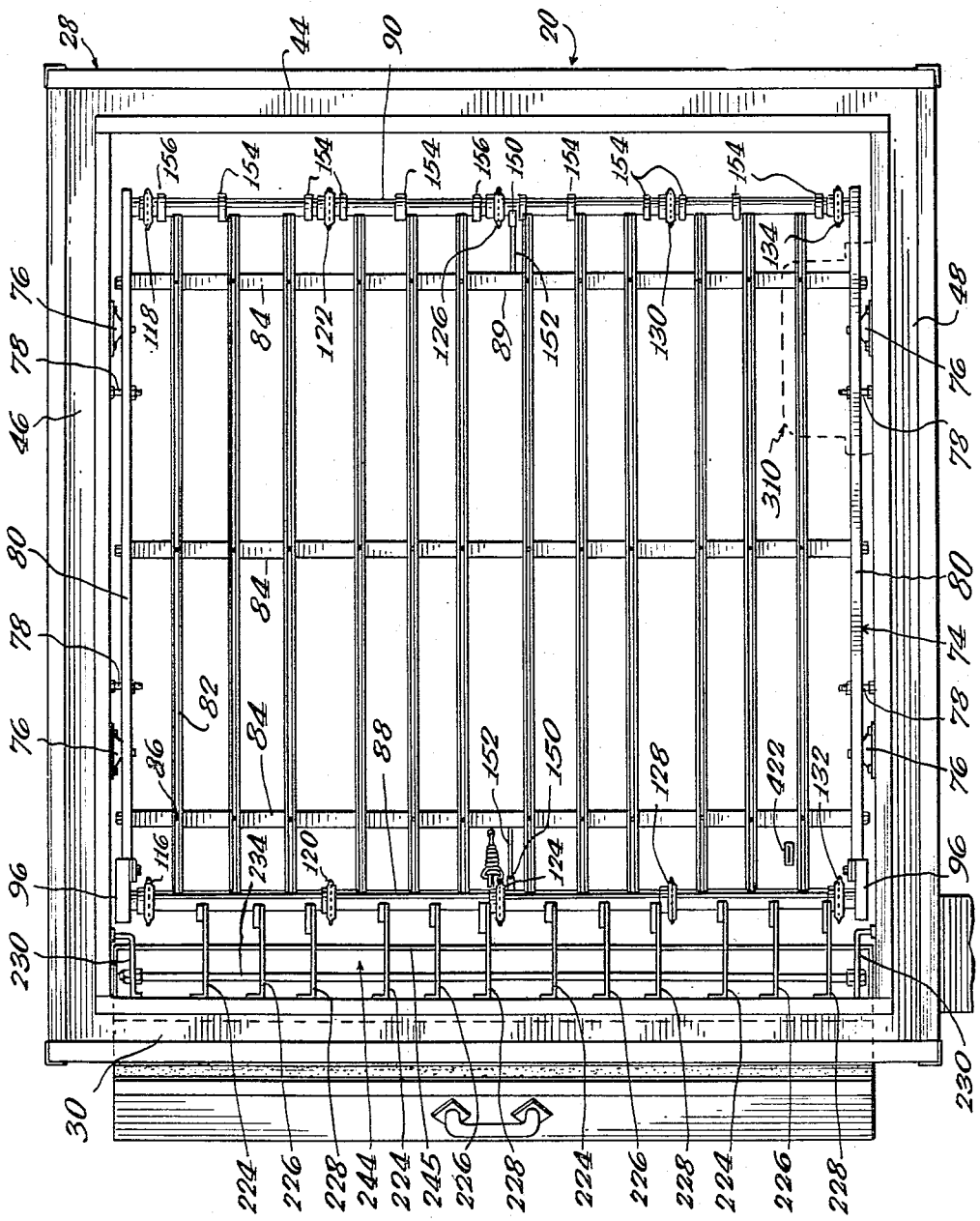

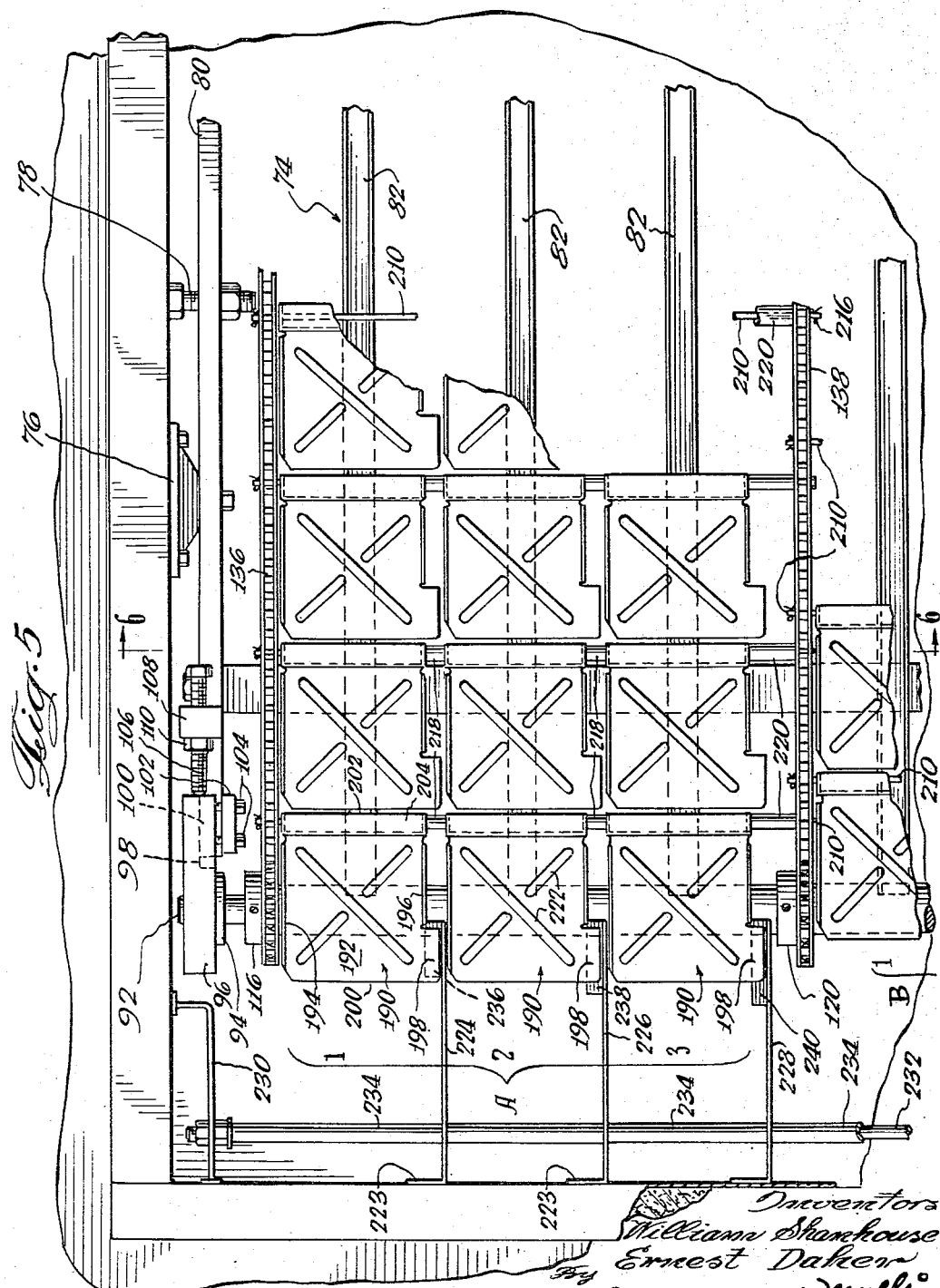

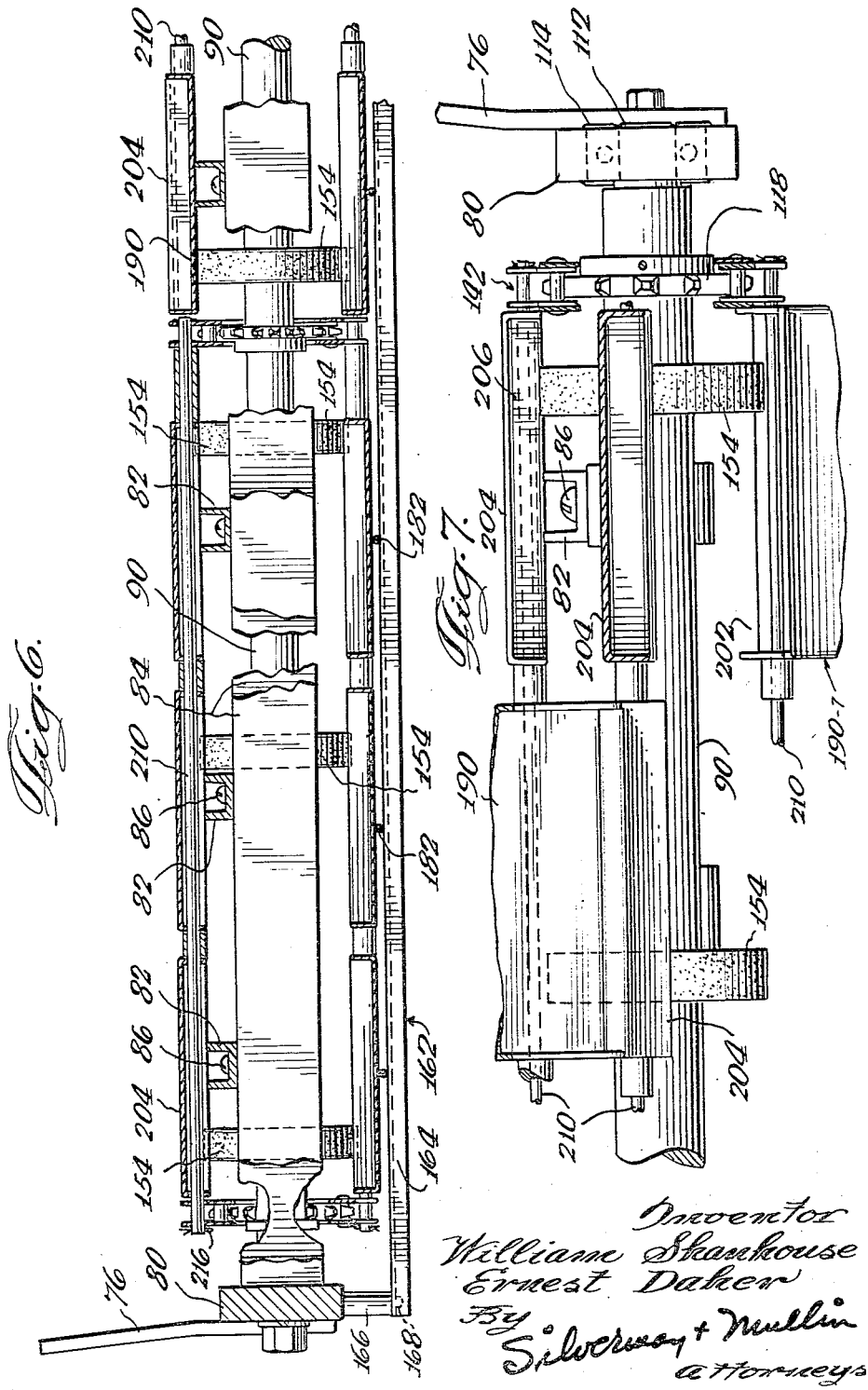

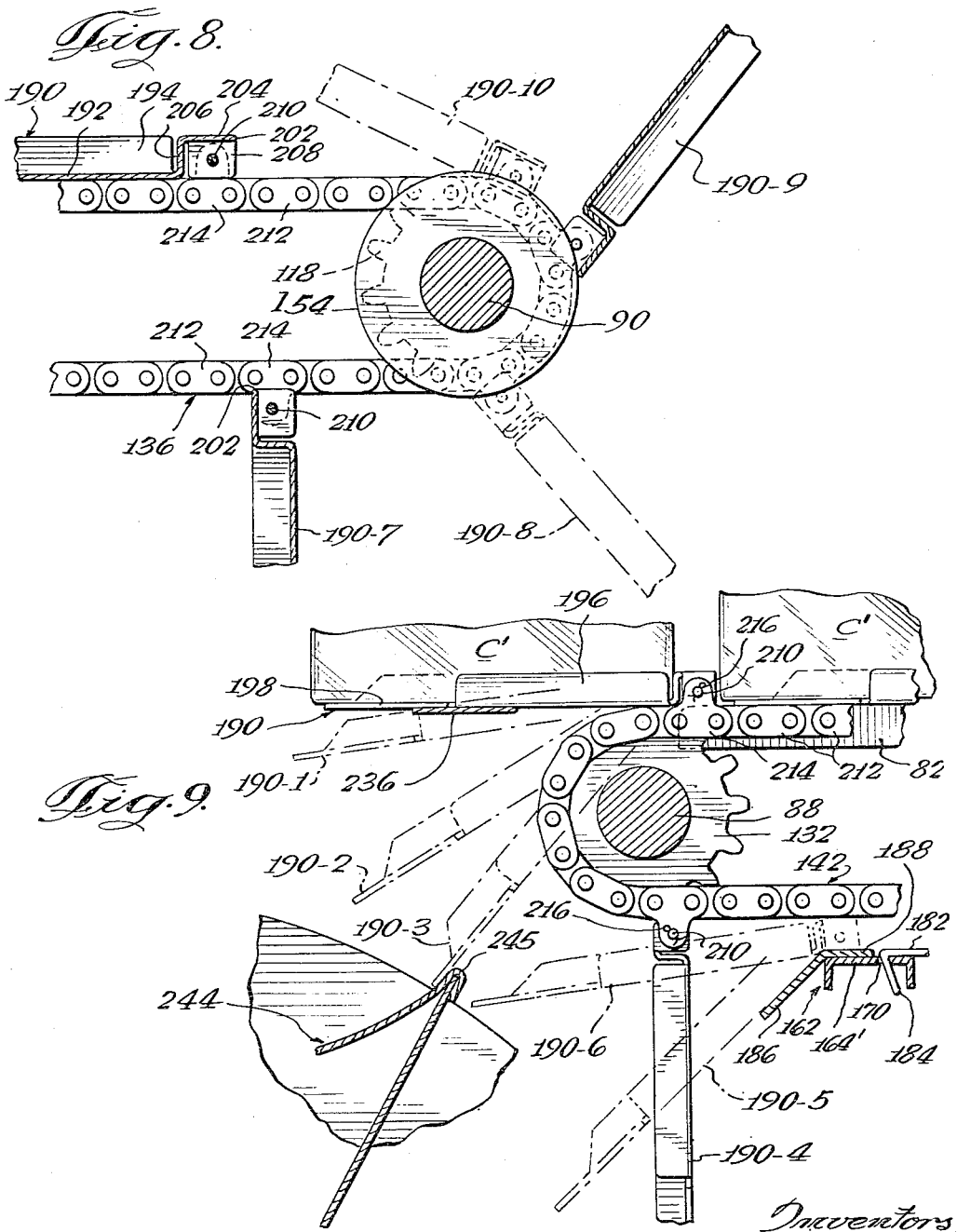

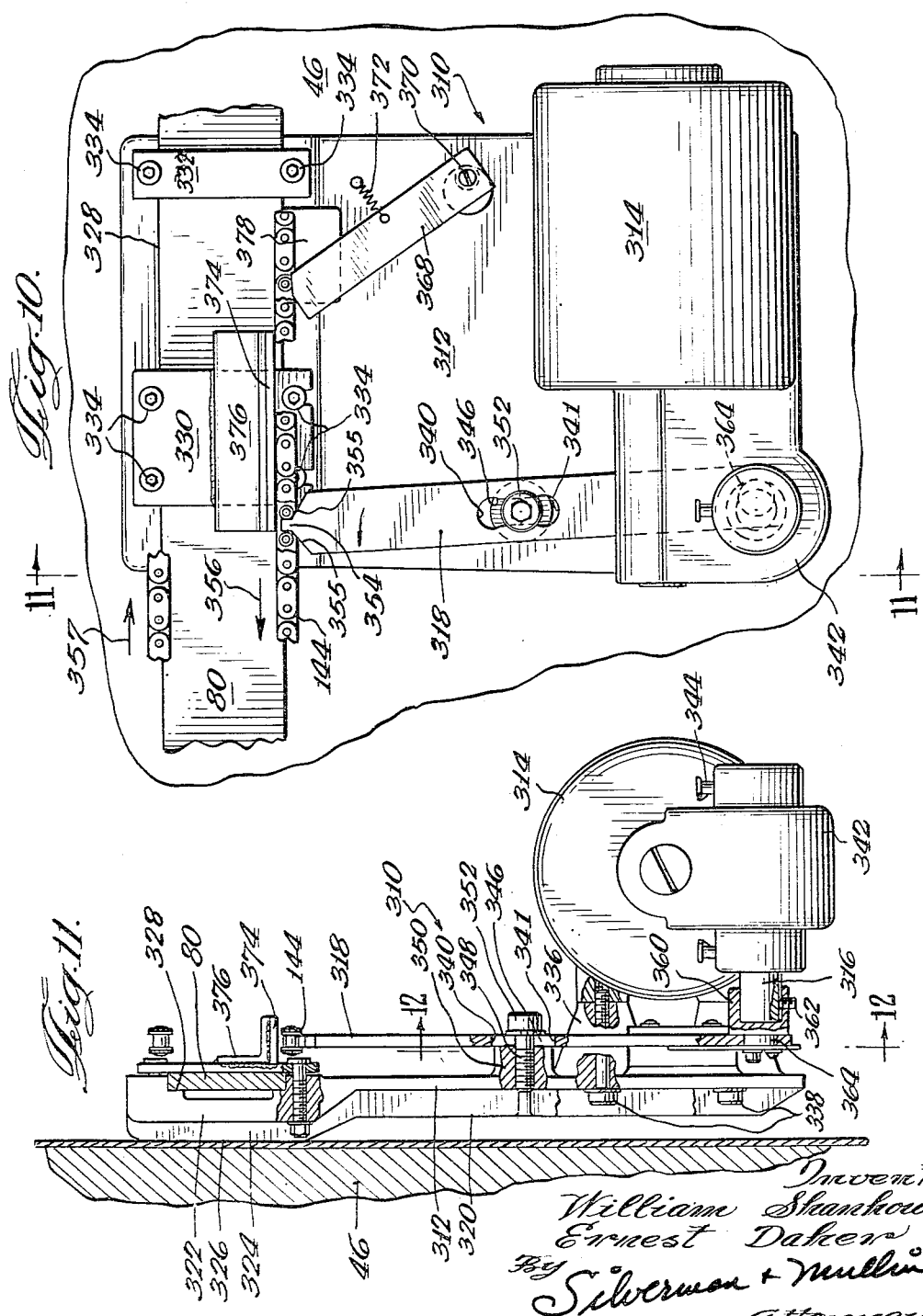

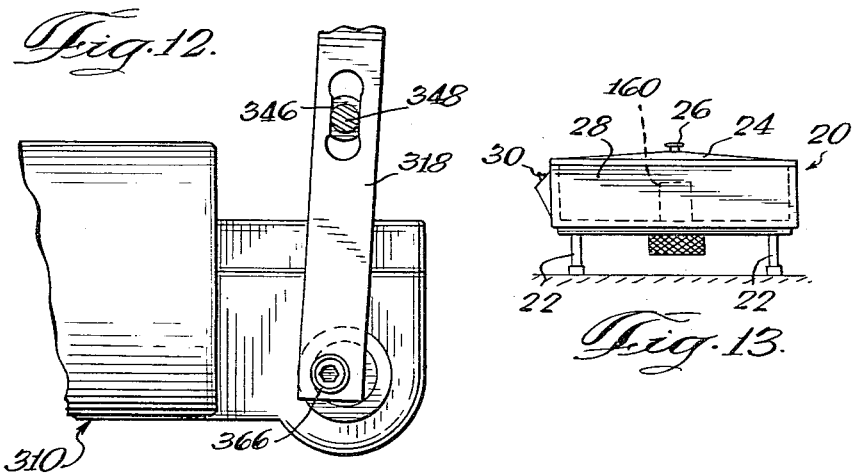
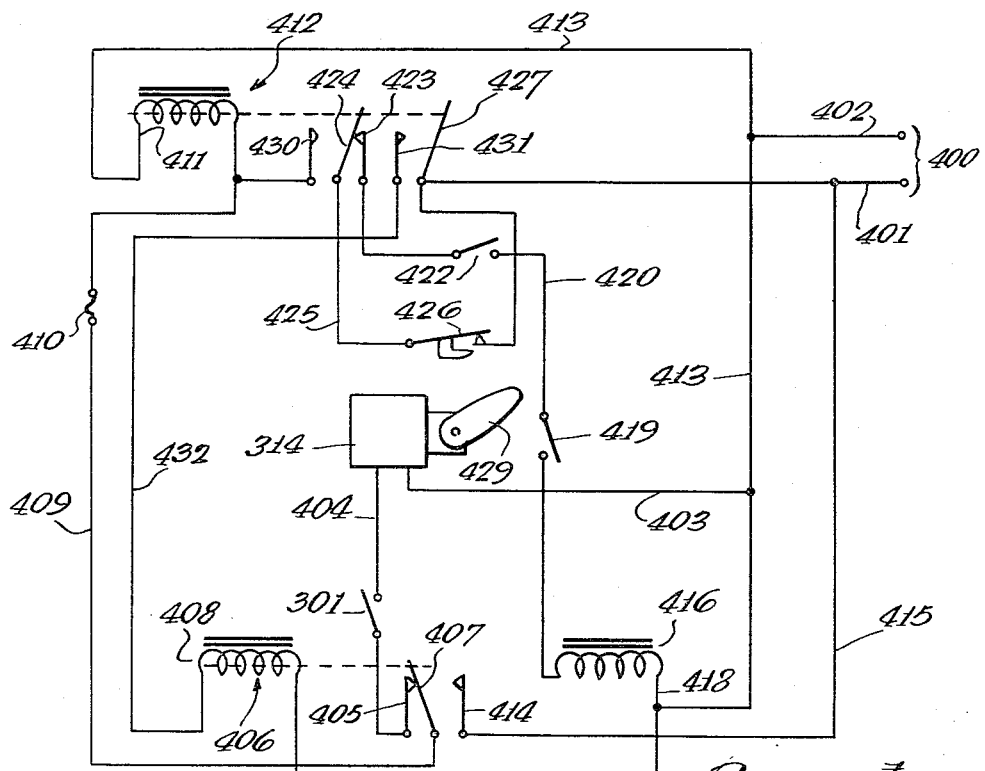

2,765,101

MILK CARTON DISPENSING MACHINE

William Shanhouse, Hicksville, and Ernest Daher, Babylon, N. Y., assignors to Shanner Equipment Company, La Grange, Ill.

Application March 16, 1955, Serial No. 494,679

39 Claims. (Cl. 221—14)

This invention relates generally to dispensing machines and more particularly is concerned with a milk carton dispensing machine designed to store a large number of cartons of some dairy product such as milk or the like under refrigeration and cause the same to be delivered to a receiving trough from which the cartons are readily removed, the delivery of each carton being accomplished by a suitable circuit closing mechanism operated by checks or coins if desired.

Reference is made to cartons of milk, but the application of the machine to cartons of milk is only by way of example. The particular device illustrated and described hereinafter was constructed for dispensing principally, half-gallon cartons of milk, but the invention is applicable without change to the dispensing of cartons of milk of smaller volume, to cartons of cream, cheese, or fluid or solids of any type capable of being supported upon the trays of the device. Likewise through suitable modification, but only in respect of protection of the machine and the containers, the invention is applicable to the dispensing of cans, bottles, boxes or any other packages of goods—either refrigerated or otherwise.

The invention is advantageous over the prior art devices especially in that the structure is characterized by simplicity and positive operation. As will be explained hereinafter, the entire operating mechanism is supported within the tank, as it is termed, in such a manner that the mechanism, including the motor and all moving connecting and support means can be removed as substantially an integral unit for service or replacement, if desired.

There is provided an arrangement of trays for the support of the commodities to be dispensed which move in rows and banks of rows, the cartons or other containers being supported erect and by virtue of the horizontal and co-planar disposition of all of the trays, there being no cooperation required between the cartons and any part of the operating mechanism of the machine. The only exception to this is that the weight of a carton on the last tray to dispense the same keeps closed a switch which, if opened, will de-energize the electrical circuit of the machine to prevent further operation thereof. This is only a refinement of the invention, however. The cartons or other packages are merely supported on the trays and hence may be of any size or shape so long as they do not extend beyond the confines of the trays to cause interference with the operating mechanism.

Obviously from that which has been stated above, the trays are arranged in a horizontal plane when carrying the cartons of milk or the like, and they move in horizontal reaches. The trays are connected to endless chains, which carry the same forward toward the front of the machine. After a tray has been dropped or tripped, in a manner which will be explained, the tray moves onto the bottom reach of its row and proceeds toward the rear of the machine. The lifting of the cover will therefore expose the upper reach of all rows of trays and will show the number of cartons remaining. It enables the machine easily to be serviced since all that is required of the service man is to fill the empty trays.

Furthermore, the fact that all cartons can be seen at the same time enables the serviceman to see at a glance the dates on the cartons, without moving any of the mechanism. Since the order of dispensing is consecutive throughout the entire machine, i. e., across the front of each row from one side to another and then in the same direction across the next row, and so on, any desired order of cartons may be placed upon the trays immediately.

The primary object of the invention is to provide a simple carton dispensing machine which has the advantages set forth above, and which is easy to manufacture, assemble and service. Other objects will be set forth more specifically hereinafter.

An important object of the invention is to provide a novel construction in which there are a plurality of trays arranged in rows, there being a plurality of banks of equal number of rows, all of the trays being movable simultaneously and the same distance for each movement, but cooperating with novel tripper feet provided at the forward end of the machine to drop only one tray at a time across the front end of all rows in consecutive order, notwithstanding that the entire plurality of trays moves forward with each separate energization of the driving mechanism.

A corrolary of the object immediately above referred to is the provision of means whereby each energization of the driving mechanism of the machine will cause all of the trays thereof to move forward a predetermined distance, but by virtue of the construction of the trays and the provision of a novel arrangement of tripper feet, only one tray dispenses its load for each of such movements.

Another object of the invention is the provision of novel means for supporting the trays in their forward movement and also novel means for supporting the trays in their rearward movement while on their bottom reaches.

Still a further object of the invention is the provision of novel means for supporting the trays of the machine by pivotal connection to endless chains secured at the rear of the respective trays, whereby the trays may pivot forward and downward when each reaches the front end of their respective upper reach, and whereby while on the bottom reaches of the respective rows, the trays are pulled toward the rear of the machine, pivoted ends first.

An important object of the invention is the provision of novel means for flipping the trays from depending disposition at the end of the bottom reaches to right side up carton-carrying disposition while passing over the rear drive shaft of the apparatus.

Another object of the invention is the provision of a novel arrangement of trays and tripper feet or extensions, the tripper feet being of different length for each foot serving a particular row of each bank, but all of the feet being generally aligned across the machine, transverse of the direction of movement of the trays.

Further objects have to do with the provision of novel tray constructions, cooperating with the tripper feet, with the endless chains, and with the flipper mechanism.

Still another important object of the invention is the provision of a plurality of rows of trays, there being a plurality of banks of rows, each having several of the rows therein, the respective trays of each bank being aligned, but the banks being spaced one relative to the other in the direction of movement of the tray rows, whereby the front tray of each row of only one bank reaches the front end of the machine at the same time, the tripping structure being such as consecutively to trip each of the said front trays in consecutive movements of all trays.

Another object of the invention is the provision of a novel trough arrangement whereby the carton or other container dispensed from any tray will be directed into the trough and be readily removable therefrom merely by tilting the door of the machine forward. In this respect the invention is also advantageous over the prior art devices in that no complex or expensive delivery mechanism is needed, the movement of the delivery mechanism being accomplished merely by the customer pulling a handle and exposing the trough into which the carton has been deposited.

An important object of the invention is the provision of novel drive means which includes a motor driven actuator arm having a tooth entering between links of one chain and moving the same a predetermined distance, all of the chains of the driving mechanism being connected for simultaneous movement.

The invention has many novel aspects which are not being specified by way of objects, but it is to be understood that notwithstanding, the invention includes the attainment of advantages inherent in the functions accomplished. The artisan skilled in this art will fully appreciate and understand the novelty thereof as the specification proceeds.

In order, not only to comply with the patent statutes, but as well to render the explanation lucid and enable a full and complete understanding of the manner in which the objects of the invention have been achieved, there is illustrated a preferred embodiment of the invention, by way of example. This structure, in its many details, configuration, size, shape and proportion of parts, is capable of wide variation without in any way departing from the spirit of or sacrificing the advantages of the invention, and it is intended that such variations are well within the scope thereof. Indeed, commercial structures constructed in accordance with the teachings of the invention have varied from device to device, and also have been different in many details from the milk carton dispensing machine here illustrated and specifically described, but in each case the basic principles, not only of function and operation, but of construction as well have been utilized.

In the drawings, in which the same or similar parts are designated throughout by the same characters of reference:

Fig. 1 is a sectional view through the center of the milk carton device constructed in accordance with the invention, portions being broken away.

Fig. 2 is a diagrammatic view in plan of the trays showing the rows and banks.

Fig. 3 is a sectional view of the front end of the machine on an enlarged scale showing how a carton is dropped off a row and delivered to the dispensing trough.

Fig. 4 is a plan view of the interior of the device, but showing the upper supports for the banks of trays, the trays not being illustrated in order to show constructional details.

Fig. 5 is an enlarged fragmentary plan view similar to that of Fig. 4 but of a corner of the device and with the rows of a bank of trays shown. No cartons are carried on these trays.

Fig. 6 is a sectional view taken generally along the line 6—6 of Fig. 5 and in the direction indicated.

Fig. 7 is a rear elevational view of a portion of Fig. 6 but on an enlarged scale.

Fig. 8 is a sectional view taken through the return mechanism at the end of one of the rows of trays, showing the manner in which the trays are flipped around the back end of the row.

Fig. 9 is a similar view but of the front end of the row and showing progressively the manner in which the tray is dropped and carried around to the bottom reach to be returned to the rear of the row.

Fig. 10 is an elevational view of the drive mechanism for moving all banks of trays forward simultaneously.

Fig. 11 is a sectional view taken generally along the line 11—11 of Fig. 10 and in the indicated direction.

Fig. 12 is a view taken from the rear of the driving member generally from the plane defined as 12—12 in Fig. 11.

Fig. 13 is a small size elevational view of the complete device.

Fig. 14 is an electrical diagram of the circuit of the device.

Generally the invention lies in a simplification and rendering foolproof a large capacity, refrigerated milk carton dispensing device. Specifically, the invention provides a great many important features which render the device easy to service, operate, construct and maintain. The device provides for dispensing the milk cartons from horizontal rows of trays so that the size of the carton has no bearing upon the construction or operation of the device. Because of this, the device is compact, as can be seen in Fig. 13. Note that the device 20 is quite shallow, and is mounted upon standards 22 and hence is easy to move, transport, and keep sanitary. In the commercial version of the device, the entire top is removable, being in the form of a cover 24 with a locking device, 26.

A plurality of rows of trays with the rows arranged in banks move forward in the device 20 between the sides of endless sprocket chains. The trays are horizontally arranged when travelling the top reaches of their movement, and tilt off the front end of their reaches, after which each is carried back along its bottom reach also in a horizontal condition so that there is plenty of room below the trays for storage without increasing the size of the device. At the end of its bottom reach, the trays of each row hang vertically.

The housing 28 is generally rectangular and as stated, the rows all move toward the front and consecutively drop cartons into the dispensing trough, access to which is gained by pulling forward on the handle 30 which tilts a portion of the front wall 32 of the housing 28 outward. The dispensing trough is integral with the tilting portion of the front wall and it exposes the previously dropped carton. The dispensing trough extends the complete width of the device and hence the entire length of said portion of the front wall also tilts forward. Means may be provided for checking the movement of the wall, and for keeping the interior of the device closed off while the trough is exposed so as not to lose cold air unnecessarily and further to prevent the purchaser from tampering with the dispensing mechanism.

There are provided a plurality of banks of trays each having a plurality of rows. In the particular device to be described in detail hereinafter, there are twelve rows, in four banks. These are designated generally bank A, B, C and D (see Fig. 2) looking at the banks from the front end of the device, that is the end toward which the top rows move. In Fig. 1, the movement is to the left. Each bank has three rows, which will be designated in accordance with the bank in which they are. Thus, in Fig. 5 there are seen rows A1, A2, A3 and a part of B1. In other words we can see the first three rows of bank A and the first row of bank B.

Note that the trays of each bank are aligned transverse of their direction of movement, but the trays of the different banks are rearwardly offset one from the other slightly, beginning with the bank B and continuing with the banks C and D. Since all of the banks and rows move forward simultaneously each time the device is energized, as for example by a customer placing a number of coins in the check-controlled mechanism, starting with a situation where the first three trays of bank A are poised just at the front of the device in position for dispensing, all three of the trays of bank A will dispense their cartons first, and thereafter the consecutive banks will dispense theirs in order. This is made clear in Fig. 2 by illustrating the banks and rows as though there were no bottom reaches for continuous movement, but considering only that each bank begins at a particular point. Thus, for the situation where the bank A is at line 35 the first dispensing trays of the bank B are spaced rearward by the distance 37, the first dispensing trays of bank C by the distance 39, and the first dispensing trays of the bank D by the distance 41.

It will be seen that if the driving mechanism requires three movements to traverse the distance 37, and an additional three to traverse the distance 39 and still another three movements to traverse the distance 41, the device is capable of dispensing twelve cartons from the front ends of the rows, at most, three at a time starting with bank A and so forth in twelve movements. This repeats as the banks are continuously moved forward, and always in the same order.

It is obviously impractical to dispense three cartons simultaneously. Because of this, means of an important nature, but simple structure is provided such that in each movement forward, only one carton at a time will be dispensed. Through a novel arrangement of tray control projections cooperating with extensions or tripper feet mounted at the forward end of the device, after the position marked by the line 35 of Fig. 2 is reached by each bank, the first movement thereafter will drop only the first tray of the No. 1 row, the second will drop only the first tray of the No. 2 row, and the third movement will drop the first tray of the No. 3 row. Thereafter the next bank is in position at the line 35, and three movements forward of the entire assemblage of trays drops the first trays of the three rows consecutively. Looking at Fig. 2, the movements of the banks will result in the consecutive dropping of trays in the following order: A1, A2, A3, B1, B2, B3, C1, etc.

After a tray has dropped its load, it is carried around the front end of its row and to the bottom thereof and moves along the bottom reach in an upside down horizontal condition to the back end of the bank where, after dropping to vertical hanging condition for a short distance, it climbs back around to erect horizontal condition capable of supporting a carton. When all the cartons have been dropped, a shut-off mechanism is provided to reject coins. A suitable warning signal may be operated to inform the prospective purchaser that the machine is empty.

To service the machine, the workman merely opens the top by removing the cover 24 and places a carton on each tray. There is nothing else to do. All of the trays are empty and all are poised in carton-carrying condition. He either takes the cartons out of the bottom storage space or places new cartons on the trays, shuts the cover, and the machine is ready to dispense. There is no need for pulling up turned down trays, or moving chains or trays to loading position, or doing any of the other things required in prior devices.

Considering now the more specific details of the device, as stated, the same is in the form of a housing 28 which is preferably rectangular in configuration, giving rise to the front wall 30, rear wall 44, side walls 46 and 48 (Fig. 4) a bottom wall 50 and having a cover member 24 (Fig. 1). The walls and the cover member are formed of conventionally constructed thermally insulating material, such as for example inner and outer metal or wooden shells with insulation interposed. This is perhaps best illustrated in Fig. 1 which illustrates the cover 24, front wall 30 and bottom wall 50 in section. In each case there is provided a dead space 52 provided with some kind of insulating batting such as rock wool, fibre glass or the like.

The housing is formed preferably by welding, into an integral tube or tank of substantially air tight structure, although air leakage of a minimum amount is almost unavoidable in a device of this kind. The corners are illustrated as reenforced by overlapped angle members such as shown in Fig. 1 at 54 and at the top four corners there may be provided upwardly protruding angular guides 56 to seat the cover member 24 whose weight, combined with compressible gaskets 58 renders the connection very tight. The tub or housing interior is provided with a truss 60 which extends along the length of the housing and is rigidly secured as by bolting the ends thereof to the front and rear walls as at 62. In its center there is a nut 66 which is permanently secured and is adapted to receive therein the threaded end of a long bolt 68 inserted into the center of the cover 24 and capable of securing the cover to the top of the housing. To prevent unauthorized removal of the cover 24, the bolt head is concealed by a locking device 26, which is illustrated simply as a hood 70 the mouth of which is closed by a locked cap 72.

Looking now at the view of Fig. 4 one sees the housing 28 in plan, with none of the trays or sprocket chains in position. The guide means for the movement of the trays along their upper and lower reaches comprise rectangular frameworks which are preferably welded together into assemblies supported in the housing. The guide means illustrated in Fig. 4 may be termed the upper plate carrier frame assembly 74. It is hung on the inside of the housing by means of sheet metal hanger plates 76 which are welded or bolted to the interior faces of the side walls 46 and 48. Perfect centering of the assembly 74 may be achieved by suitable spacing bolts 78 which are adjustable. The hanger plates 76 and centering bolts 78 are secured to the side bars 80 of the assembly 74.

Now, considering the device generally, and keeping in mind what has been described thus far by way of operation, the trays are connected to sprocket chains driven by wheels on shafts supported by the assembly 74. They move along the length of the assembly from right to left as viewed in Figs. 4 and 5 and the milk cartons are carried on the trays. The assembly 74, besides providing the support for the sprocket wheel shafts, guides and provides bearing surfaces for the moving trays, which, being made of thin gauge metal are incapable of supporting the heavy cartons of milk by themselves. Thus, there is provided an elongate rail or stringer under each row of trays, extending the length of the assembly 74, said stringers each being designated 82, and reference being made to the bank and row in discussing the same. Thus, starting with the top stringer of Fig. 4, the stringers are 82—A1, 82—A2, 82—A3, 82—B1, 82—B2, etc. going down the figure. The bottom stringer will thus be 82—D3. This method of reference will only be used in the discussion, and not in the illustrations to avoid clutter.

Intermediate their ends the stringers are supported by several bars or cross members 84 which are bolted between the side bars 80. The stringers may be formed of simple metal straps, or other stock presenting an upper bearing surface. For example, the illustrated stringers 82 are formed of upwardly open channel members secured to the cross members 84 by screws 86. At the front and rear ends of the assembly 74 there are provided the shafts 88 and 90 which carry the sprocket wheels, presently to be described.

The front shaft 88 is suitably journalled at opposite ends 92 in bearings 94 which are mounted in bearing blocks 96 which in turn are mounted on the front ends of the side bars 80. Looking at Fig. 5, it will be seen that the bearing blocks 96 are each provided with a centrally disposed rectangular groove 98 within which the front end 100 of the side bar engages. The said end 100 is clamped into the groove 98 by a pressure plate 102 straddling the exposed portion of the end 100 and exerting force against said end by virtue of screws 104 which pass through the pressure plate and enter suitable threaded holes in the bearing blocks 96 on opposite sides of the grooves 98. The adjustment of the position of the bearing blocks 96 adjusts the distance between axes of the shafts 88 and 90 and hence adjusts the tension in the sprocket chains whose wheels are carried by the shafts. Fine adjustment and locking of the positions of the bearing blocks 96 is achieved by means of pusher bolts 106 each of which is disposed parallel to the side bars 80 with its end engaging the end of the respective block 96, the bolts being threaded through suitable nuts 108 which may be welded to the top edge of the bars 80. A lock nut 110 is provided as shown, on each bolt 106.

The rear shaft 90 (see Figs. 6 and 7) has its ends 112 fixed relative to the side bars 80; the ends of the bars 80 having suitable bearings 114 set thereinto. Obviously, adjustment of the distance between the axes of shafts 88 and 90 is limited to movement of the bearing blocks 96 relative to the side bars 80, although the same adjustable bearing support structure could be provided at both ends of the bars 80.

Conveniently, for the description of the remainder of the assembly 74 we may refer to Fig. 4. The front ends of the stringers 82 terminate just at about the position of the shaft 88 so that the trays will move off the stringers onto the tripper plate feet as will be described. The rear ends of the stringers terminate just at the shaft 90 to receive the trays as they are flipped around from bottom reaches of the rows. Each of the shafts has five sprocket wheels keyed thereto for rotation therewith. Front and rear sprocket wheels are properly aligned. Thus, end sprocket wheels 116 and 118 are aligned, opposite end sprocket wheels 132 and 134 are aligned, center sprocket wheels 124 and 126 are aligned, and intermediate sprocket wheels 120 and 128 are respectively aligned with intermediate sprocket wheels 122 and 130. The sprocket wheel aligned pairs have chains engaging the same, there being a total of five chains designated 136, 138, 140 (Fig. 1), 142 (Fig. 9) and 144 (Fig. 10). Thus, there are two chains alongside each bank, the center chains 138, 140 and 142 each serving two banks. The chain 144 is the only chain that is driven, but since all chains are arranged upon opposite sprocket wheels secured to the shafts, all chains will move simultaneously. Since said chains may take the form of other flexible members, the sprocket wheels may be considered sheave means.

A simple stabilizing bearing block 150 is provided at the center of each shaft 88 and 90 (see Fig. 4) being held in position by an adjustable rod 152 engaging against the centers of the adjacent cross supports 84.

Between each pair of sprocket wheels the rear shaft 90 is provided with three flippers in the form of rubber discs 154 mounted on the shaft in general alignment with the respective rows for the purpose of flipping the trays to their horizontal carton-carrying positions from their down-hanging positions.

Except for the trays, this completes the description of the upper plate carrier assembly 74. Generally the trays are secured between the chains and are moved forward in horizontal disposition along the stringers 82. When the front end of the upper reach of each row is passed, the trays drop down and their weight would cause them to hang vertically from the sprocket chains throughout their movement along their bottom reaches. This will be obvious from a study of Figs. 1, 8 and 9. As a matter of fact, as will be seen, at the beginning and end of the bottom reaches the trays do hang downwardly. During the major portion of their rearward travel however, they are horizontally supported in upside down condition thus giving rise to the large storage space below. In Fig. 1 it will be seen that there are a plurality of boxes of cartons of milk indicated at 158 stored below the assembly described. The interior of the housing 28 is refrigerated by any conventional means, such as for example, a refrigeration unit shown in phantom in Fig. 13 at 160. Even if there were sufficient space to permit the trays to hang down during their rearward travel, this is inadvisable since in using the storage space below the assemblies, the parts and mechanism might cause interference and trays could get bent and broken.

Because of this, a bottom plate carrier assembly 162 is provided of rather light construction, since it is only needed to support the trays themselves.

This bottom plate carrier assembly is not shown in Figs. 4 and 5 which are top views because not enough thereof would be visible normally. However, the assembly 162 is seen, at least fragmentarily in Figs. 1, 3, 6 and 9. It is formed of four cross members 164 preferably of channel shaped cross section, the ends of which are secured to the bottom edges of the side bars 80 by the spacers 166 and screws 168. The front cross member 164' and the rear cross member 164" (see Fig. 1) are provided with holes 170 as best seen in Fig. 9 spaced along the lengths thereof aligned with the stringers 82. Straight wires 182 are stretched across the cross members 164 in alignment with the stringers 82 so as to support the inverted trays of each row while said trays are moving rearward on their bottom reaches. The wire ends are reverse bent as shown at 184 in Fig. 9 with the resulting hook-like formation engaging in the holes 170.

The front cross member 164' has an elongate relatively wide lip 186 secured thereto along its length by means of an angular extension 188 welded to the top edge of the cross member 164'. The lip 186 serves as a tray guide as will be described hereinafter in connection with Fig. 9. At this time it may add to the explanation to state that the trays are dropped off the front end of their respective stringers dropping the cartons held thereon, and follow the sprocket wheel thereat around to the bottom where they hang. They are carried into engagement with the lip or tray guide 186 which guides them in a lifting motion onto the lower assembly 162 whereby they move rearwardly in an upside down condition supported on the guide wires 182. Note that the rear cross member 164" is spaced a substantial distance forward of the rear shaft 90 so that by the time the sprocket wheels of the shaft are reached, the trays are hanging vertically ready to be flipped to the top of their respective reaches.

Referring once more to the upper plate carrier frame assembly 74, as explained the same is designed and intended to support the movement of the trays forward. In Fig. 5 an enlarged plan view illustrates the trays moving forward. Each tray is designated by the character 190 and is formed of sheet metal, such as aluminum alloy or stainless steel. There is a rectangular body portion 192 the front corners of which are rounded. One edge is turned upward to form a flange 194 and the opposite edge has only a portion thereof turned up as shown at 196. This provides a flat portion 198 serving as an extension on the said opposite edge which is arranged to cooperate with the tripping means. The trays 190 move to the left as viewed in Fig. 5, and hence the leading edge may be designated 200 and the trailing edge 202. Adjacent the trailing edge the tray is integrally bent upward and rearward to provide a formation which is somewhat like an upwardly offset flange 204 having a vertical connecting web 206. The ends of the flange 204 are bent downwardly to form a pair of opposed ears 208 so that in effect there is a box-like structure at the trailing edge 202 of each tray but which is open on its bottom and rearward edges.

As previously alluded to, the trays are arranged in banks of three rows, the rows of each bank moving in alignment. In Fig. 5, there can be seen rows 1, 2, and 3 of bank A. Since all of the banks are mounted in the same manner, the description of any part of the device will apply to all others. The trays 190 of each bank are mounted in groups of three on pintles or rods 210 which pass through the ears 208 of each tray of the aligned group, the ends of each rod being secured between sprocket chains. The pintles 210 of the first bank A have their ends secured to sprocket chains 136 and 138. Each of the sprocket chains has two types of links, as best shown in Figs. 8 and 9. The conventional type is designated 212, and the other type 214 which occurs every ten or so links on chain 136 has an outwardly extending perforated portion. The ends of the pintles are passed through the perforation and secured in place as for example by cotter pins 216. Spacers 218 separate the trays 190 of rows 1 and 2 and spacers 220 separate row 3 from the sprocket chain 138. Obviously any suitable arrangement of spacers can be used in order to center the trays over their respective stringers 82.

The explanation above points out that the trays are mounted in groups of three, all three being pivotally arranged upon the same pintle 210 which is carried forward by movement of the sprocket chains. The sprocket chain 144 also has the same number of links 214 as sprocket chain 136 because it is an outside chain. The other three chains have twice as many of the type 214 links because each of the chains 138, 140 and 142 supports pintles from both sides. The different alignment of banks B, C and D enables the pintles 210 of the respective banks to be spaced rearward of the previous bank. Thus, in Fig. 5, it will be seen that the pintle 210 of the very first group of three trays of bank A is mounted a substantial distance ahead of the pintle 210 of the first group of three trays of bank B. There are several links in chain 138 between pintles of banks A and B. This spacing is continued in the case of the other banks as well.

All chains move forward at the same time, as set forth hereinabove, so that the trays of the banks will reach the front of the apparatus in the respective order A, B, C and D. Each of the trays is adapted to carry the cartons, several of which are shown at C' in Fig. 3, and drop them off at the front of the apparatus. The trays are strengthened by the flanges 194 and 196, and in addition upstanding cross-wise ribs 222 may be stamped into the trays for additional support and to stabilize the cartons upon the trays.

The designation "tripper" mechanism as used herein is somewhat of a misnomer because actually the apparatus referred to does not move. The tripping, as such, occurs when the movement of the chains carries the trays forward over certain formations which are to be described herein.

At the forward end of the apparatus are mounted a plurality of so-called tripper plates which will be designated 224, 226 and 228 for the reason that although they are identical in most respects, each has a foot of a different size, there being three sizes. Each plate serves a different row. This is best seen in Fig. 4. The plates 224 serve rows A1, B1, C1 and D1; the plates 226 serve rows A2, B2, C2 and D2; and the plates 228 serve rows A3, B3, C3 and D3. At each side of the front of the apparatus there are provided heavy brackets 230 secured to the inside walls of the housing 28. The brackets 230 mount at least one tie rod 232 between them, the ends of the tie rod 232 being threaded and secured to the brackets 230 by suitable nuts. The tie rod 232 passes through openings in each of the plates 224, 226 and 228 and the spacing between plates is maintained by means of spacers 234. The plates are also secured as by welding to the inner face 32' of the front wall 32 (see Fig. 3) so as to render the same rigid.

Each of the plates 224, 226 and 228 has a foot or extension which projects forward in alignment with the upper reaches of the respective rows. These feet are so arranged that they are aligned with the extensions 198 of the trays 190 of each row, and slightly under the same, so that as the sprocket chains move forward the trays will ride off the end of their respective reaches and onto the waiting foot of the particular tripper plate. Considerable forward movement is possible past the sprocket wheel, because the trays are pivoted at their rear edges 202 and can thus move horizontally forward until the pintles 210 are carried over the sprocket wheels of the shaft 88.

This movement also carries the trays 190 beyond the support of their stringers 82 so that the only support that remains is the support of the extensions 198 upon the feet. The feet are horizontally disposed and integral with the tripper plates 224, 226 and 228. There are three different lengths of feet, which will be referred to as short 236, medium 238, and long 240. The plates 224 all have short feet, the plates 226 all have medium feet, and the plates 228 all have long feet.

Since all of the rows of each bank move forward at the same time, when a trio of trays of any bank ride upon the feet of the tripper plates associated with the particular bank, if the feet were all of the same length, and all positioned in the same manner relative to the rows, the trays of a particular group would all drop at the same time. This is because the trays 190 all have the same length of extension 198, it being easier to make them this way. By changing the lengths of the feet, the trays can drop one at a time. Furthermore, only a very small movement need be required for the sequential dropping of trays. Thus, considering Fig. 5, the trays of the first bank A have ridden out upon the feet 236, 238 and 240 respectively. In order for the extension 198 of the first tray of row A1 to drop, all of the trays must move forward until the trailing edges of the extensions are all just past the short foot 236. But, since the feet 238 and 240 are longer than foot 236, only the tray of row A1 will drop its carton into the trough for dispensing. The driving mechanism is adjusted so that thereafter one cycle of the drive mechanism will move the trays forward a sufficient amount to drop the tray of row A2 off medium foot 238 and another movement will drop the tray of A3 off long foot 240. This is done by suitable adjustment of the length of the feet.

Thus, each row of each bank drops the trays of any three-tray group one at a time, in an order depending upon the placement of the different feet 236, 238 and 240. In the embodiment illustrated, the number 1 row of each bank has the shortest feet 236, the number 2 row has the medium length feet 238, and the number 3 row has the longest feet 240. Obviously this order, for any bank, can be changed.

Since each cycle of the driving mechanism is operated by the customer inserting a check, or coin, there is preferably no lost movement between banks. In other words, once a group of three trays has been consecutively dropped and has dispensed the cartons contained thereon, the next operation of the coin mechanism should commerce the dispensing of the cartons from the rows of the second bank. This is done by relating the drive mechanism and the length of the feet so that three movements drops three trays. The second bank is spaced sufficiently back of the first bank so that when the tray of row A3, for example, is about to be dropped off its long foot 240, the extension of the tray of row B1 is upon its short foot 236. The next cycle of driving drops the tray of row A3 and poises the tray of row B1 at the end of its foot. The next movement of the drive mechanism will drop tray of row B1 and set up the next tray of the group of bank B, namely the tray of row B2. This continues, so that the order of tray dropping is consecutively across the apparatus.

This procedure is required to be continuous, and hence through proper choice of dimension, considering the number of rows as $n$, the distance from a given point of one tray to the identical point of the other try should be equal to $n$ times the distance travelled by the trays in one cycle of operation of the drive mechanism.

Looking at Fig. 2, since there are twelve rows, $n$ is equal to 12. It takes three cycles for the trays to move the distance 37, six cycles for the trays to move the distance 39, nine cycles for the trays to move the distance 41. It therefore takes twelve cycles for the trays to move the distance designated 242. If the distance moved by one cycle of the mechanism is ⅜ of an inch, the distance along any row from the same points on trays will be four and a half inches. It therefore requires that one know the size of the carton to be handled before one adjusts the stroke or throw of the drive mechanism, the length of the feet, and the number of rows.

As previously mentioned, considerable variation is possible without in any way changing the basic structure of operation of the device. Several of such changes might well be mentioned here, and the variations are illustrated in Fig. 3. The trays 190 instead of having the extension 198 co-planar with the body 192, may have the side flange 196 extend fully forward to 195 and the extension is then provided at 199 on the top edge of flange 195. This will cut down on the size of the flipper plates. The flipper feet will have to be raised to the position shown at 237.

The flipper plate 225 of Fig. 3 is not fixed to the housing 28. It is fully floating, i. e. it is secured to the assembly supporting and guiding the trays. Thus the welded securement at 223 (see Fig. 5) is eliminated. Instead, heavy mounting plates 231 are secured outside of the bearing blocks 96 by screws 233 (see Fig. 3). Two of the tie rods 232 are provided for supporting all plates, the tie rods being secured at their ends to the mounting plates 231. Spacers 234 maintain distances between the plates 225.

Note that there are upper and lower tie rods 232 which may conveniently be positioned in the paths of forward movement of the cartons in dropping off the trays. The larger cartons would strike the upper tie rod 232 and spacers and thereby limit forward tipping so that the bottom of the carton drops directly into the trough as shown in Fig. 3. The lower tie rod and spacers would function the same way with smaller cartons.

The use of the immediately above described structure makes the entire carton supporting and delivering apparatus an integral unit, independent of the housing 28, except for mounting means and electrical connections. It enables the entire tray assembly to be lifted out of the tank, if desired for ease in repair, replacement and assembly.

It is believed that the principal novelty of the invention resides in the mechanism above described, although other features which will be set forth hereinafter are desirable, and intended to be included by the coverage herein.

One important feature has already been referred to in some detail in connection with the bottom plate carrier assembly 162. This is best seen in Fig. 9 and it relates to the method of lifting the dropped trays 190 onto the wires 182 of the bottom assembly. When the tray 190 has been carried forward onto a foot it extends substantially beyond the sprocket wheel. Let us presume that in Fig. 9, the sprocket wheel is 132, the chain 142, the row illustrated is C1, and hence that the foot shown is a short one, namely 236. The tray just prior to dropping is designated 190 in said Fig. 9. This is in solid lines. Note that the stringer 82 has been fully cleared. The next movement of the drive mechanism carries the extension 198 over the edge of the foot 236. The tray drops its carton into the trough which is designated generally 244, and since it is no longer supported it pivots about its pintle 210 into the various broken line positions 190–1, 190–2, 190–3. The tray may be resting upon the upper lip 245 of the trough 244 and/or upon the shaft 88. In any event, the shaft limits its pivotal movement. During the next several movements of the apparatus, it being recalled that the trough in every case will be pulled out and returned, the tray is finally hanging straight down as shown at 190–4 which is in solid lines. As the sprocket wheel has carried the chain about itself, the position 190–4 represents the beginning of the bottom reach of the row and the commencement of rearward movement of the trays. The next several movements of the sprocket chain will carry the tray along until the bottom of the tray (now facing the rear of the apparatus) engages the protruding lip 186 such that further movement lifts the tray as shown in broken lines at 190–5. Further movements will lift the tray as at 190–6 up onto the wire 182 and it will retain this horizontal but upside down condition, until it passes the last cross member 164″ (see Fig. 1) after which it drops once more to hanging position, this latter situation being illustrated in Fig. 8 at 190–7.

In Fig. 8 there is illustrated still another feature of the invention which is concerned with bringing the trays 190 around the back end of the apparatus from the bottoms to the tops of the reaches, flipping them into horizontal carton-carrying disposition. When the end of the bottom reach is attained there is no supporting means, the wires 182 not continuing all the way to the end, and the assembly 162 having been passed. The trays 190 therefore drop down and hang from their pintles 110. These loosely hanging trays are brought into contact with the fixed flippers 154 which conveniently are rubber discs fixedly secured to the rear shaft 90. The radius of flippers 154 is greater than the distance from the axis of shaft 90 to the now up-ended trailing edge 202 so that the movement of the chain brings this trailing edge into engagement with the flipper periphery which assumes a two point position between pintle and trailing edge 202. This will tilt the tray forward and cause this position to be retained during rotation of the flipper 154 and until rectilinear movement of the chain at the top of the reach carries the tray forward once more off the flipper. Of course, in the meantime the flipping movement has been accomplished and the tray is right side up.

The various positions of the tray are shown in Figs. 8 and 7. The tray is hanging straight down at 190–7, and it will be seen that continued movement of the tray rearward will cause the trailing edge 202 to engage the periphery of the flipper wheel 154. At 190–8 in broken lines there is illustrated the position of a tray after having been engaged by the flipper wheel and started on its movement up the back thereof. The next position illustrated is at 190–9, the tray having been moved somewhat more than half way up the back of the flipper wheel 154, shown in solid lines. At 190–10, in broken lines, the tray is just achieving its right side up position on the top reach.

Where the mechanism is fairly tight, that is with little backlash, and the pintles hold the trays fairly taut, the arrangement described is quite effective for the function described. In some embodiments where the structure is loose, a modification, not illustrated, has been utilized in which the center flipper wheel of each group of three is of larger diameter to apply tension on the pintles 210 to prevent sagging of the trays.

The lower portion of the front wall 32 is in the form of a large door 250 which is generally triangular in section, having a front wall 252, a rear wall 254, end baffle plates 256 and a top wall 258. The configuration enables the entire door 250 to pivot forward and out of the housing 28 to expose the trough 244 which is secured to the top wall 258 and the rear wall 254. At this point the wall 254 will align with wall 32 so that a minimum of cold air escapes from the housing interior and so that the customer cannot have access to such interior. The door may be braced by suitable structural members such as 260, 262 and 264 and filled with any desired insulating material similar to that used in the housing walls, as indicated at 52. The door 250, in the embodiment shown, is hinged at 266 and its opening movement may be limited by any suitable stop member (not shown) which may be releasable to enable the door to be opened further for servicing.

There is provided a pair of pivotal links 270 and 272 pivotally mounted to respective brackets 274 and 276 carried upon the rear wall 254 and the floor of the tank. The ends of the links 270 and 272 are pivotally secured by a removable ring member 278. The door being quite heavy, the forward movement is counterbalanced by a helical spring 280, one end of which is hooked by a ring 282 to the link 272 and the other end of which is hooked and engaged in a suitable hole in the tank floor at 284. The return movement of the door is eased by any suitable means such as a door-check or the like, a dash-pot 286 being shown mounted to a bracket 288 inside the floor of the tub, the bracket being secured to any desired part of the housing 28 as for example by welding. The dash-pot pin 290 protrudes through an opening 291 in the tub floor to be engaged by the bottom of the door, which may have a striker plate 293 thereat.

The links 270 and 272 may limit the movement of the door outward during servicing. This movement may be beyond that which occurs when a customer pulls forward on the handle and removes a carton of milk or the like. In order to insert the boxes 158, this must be accomplished, that is, the door 250 must be pulled completely forward and downward. In order to prevent interference between the boxes and the trays which have come down to their bottom reaches but not yet reached their horizontal disposition, a tray lifter may be provided. This may take the form of a simple elongate member 292 (see Fig. 3) generally parallel with the lip 186 but wider, spaced forward of the lip and pivoted at its ends adjacent the inner side walls as at 294. A lever 296 adjacent the end is secured to the underside without the width of the plate carrier assemblies so as not to interfere therewith, and this lever is connected by a chain 298 to the end plate 256. In normal partial opening of the door 250, this chain 298 is too long to affect the lifter 292, but when the door is opened all the way, the lifter will rotate in a clockwise direction as viewed in Fig. 3 about its pivot points 294 and lift the trays (such as 190–4 in Fig. 9) and retain them in this lifted condition while the door is fully open, thereby enabling the boxes of cartons to be inserted in the storage space. The lifter 292 may take the place of lip 186 if desired.

The door is suitably gasketed as at 300. Conveniently, the door operates a switch 301 (see Fig. 14) which de-energizes the drive mechanism when the door is opened. This is to prevent accidents and jamming while a customer is removing the milk carton from the trough, which might be occasioned by another inserting coins into the check operated mechanism.

As stated, the entire assemblage of trays is driven forward each time that the motor is energized and the mechanism which enables this to occur will be explained. The drive mechanism operates only on the chain 144 and all others follow due to interconnection of shafts, sprockets and chains. Attention is invited for this explanation to Figs. 10, 11, 12 and 14.

The general location of the driving mechanism is adjacent the side wall 48 as shown in the broken line outline in Fig. 4, toward the rear of the tank. The driving mechanism is designated generally by the reference character 310 and same comprises: a motor mounting plate 312 having an electric motor 314 mounted thereon, the shaft of the motor 314 being geared down to rotate a countershaft 316 at a very slow rate, and a chain actuator 318 driven by the countershaft 316.

The mounting plate 312 has one or more strengthening ribs at various places thereon, and an example is indicated at 320. Looking at Fig. 11, it will be seen that the plate 312 is disposed generally in a plane parallel with the side wall 48, and is spaced therefrom, but there being an offset portion of heavier construction at 322 such that the continuation 324 of the rib 320 at the top of the plate 312 bears against the inner surface of the wall 48 as shown at 326. The thickened portion 322 has a seat 328 of such dimensions that the side bar 80 may be slidably engaged therein. There are two cover plates 330 and 332 which overlie the bar 80 when same is in proper position, and these plates are secured by machine screws 334 or other suitable fastening means, which serve to removably clamp th plates in position and hence to clamp the motor mounting plate to the bar 80. It being recalled that the bar 80 is one of the principal supports of the apparatus, and that the same is supported from the sides of the tank by brackets or hangers 76, it will be appreciated that the driving mechanism is not mounted to the housing 28 but is fixed relative to the tray supporting and moving portion of the device. In other words, the entire unit within the tank, including the drive mechanism is substantially an integral one, adjustment of the positions of the bars 80 resulting in adjustment of the entire unit.

The motor 314 is supported upon a base 336 which is suitably attached by bolts such as shown at 338 to the front of the plate 312. Note that the "front" of the plate is the right hand side as viewed in Fig. 11, and that the thickened portion 322 is offset "rearward" so that the bar 80 is also secured on the front of the plate.

The motor housing includes the housing 342 for the gear reduction mechanism which may be any suitable arrangement, such as a worm drive. 344 are the grease cups for such a worm drive, the details of which are of course not shown.

The chain actuator 318 is an elongate link which has a slot 346 between its ends establishing a slidable and pivotal connection with a pin 348 mounted on the motor plate face. There is a boss 350 in which a screw threaded portion of the pin 348 is engaged, the head 352 pivotally holding the actuator in place. At its upper end the actuator has a tooth 354 formed which is of a size and configuration as to enter between adjacent links of the chain 144. The shoulders 355 cooperate with the tooth 354 to cause firm engagement. The tooth 354 is adapted to enter between two links, and then move rearward of the apparatus, in the direction of the arrow 356. Since this action is applied to the bottom reach of the chain 144, the top reach will go forward, in the direction of the arrow 357 and hence move all the trays forward.

The movement of the actuator is achieved by reason of the eccentric connection of the bottom end thereof with the countershaft 316. A drive crank 360 in the form of a simple cylinder keyed to shaft 316 or held by a set screw 362 has an eccentric bearing 364 upon which the lower end of the actuator 318 is mounted and held in place by a machine screw 366. This is best shown in Fig. 12. Movement of the actuator is achieved by rotation of the countershaft. In Fig. 10 the driving stroke is about completed. The continued rotation of the shaft 316 in a clockwise direction will retract the tooth 354 from between two links, reverse motion of the chain being prevented by the detent 368 pivoted at 370 and spring urged by the spring 372.

After the tooth has been withdrawn, the rotation of the shaft 316 will carry the actuator 318 down until the pin 348 is engaged in the upper 340 end of the slot 346, the actuator rotating with its tooth clear of the chain until the eccentric bearing 364 carries the lower end of the actuator 318 up to the left side of the axis of the shaft 316 as viewed in Fig. 10. The pin 348 now rides to the lower portion 341 of the slot 346 as the tooth enters between the next two links. The continuation of movement rotates the actuator 318 in the lower portion 341 of its slot 346 while the tooth 354, still engaged between adjacent links moves to the left as viewed in Fig. 10. Thus, the chain 144 is advanced by a distance depending upon the various dimensions of the drive mechanism. When the tooth 354 engages in the links of the chain 144, the chain is guided and prevented from flexing upward by means of a bearing foot 374 which is one arm of an angle member 376 welded to the front of the cover plate 330. For example, in case the chain 144 is not so perfectly aligned as to accept the tooth 354 precisely between two links, the tooth end may engage beneath the pin of a link and push the chain upward, but with the bearing foot, the tooth will slide to one side of the link pin since the chain does not yield. The chain is guided to pass through the corner defined by the foot and the face of the boss 378 so as to present the proper alignment for acceptance of the tooth 354.

For the most part the operation of the machine is apparent from the description of the mechanical parts thereof heretofore set forth above. The artisan will appreciate that the device must operate from a source of electrical power used to drive the motor 314. It is apparent also that the motor is energized for a time sufficient to rotate the shaft 316 one revolution. This is to be done upon the insertion of the proper coin or coins in a check operated mechanism, of which there are many available commercially. The usual coin ejection means are provided along with other features not essential to the invention. A greatly simplified electrical circuit of the machine is discussed in connection with Fig. 14.

The source of power is the usual commercial line, such as 120 volts A. C. designated 400. The line connects with leads 401 and 402 which may serve as bus conductors to supply power to the refrigeration unit 160, exterior illumination of the device, and the like. For the purposes of this discussion, the principal function to be performed by the power is the energization of the cyclic driving means 310. The motor 314 is to be rotated until the shaft 316 has made one complete revolution.

The motor 314 as shown in diagram of Fig. 14 is energized through one lead 403 connected to line lead 402, and through a series of switches to the other line lead 401. These switches serve various functions. Commencing from the motor, lead 404 extends to series switch 301 and continues to left hand contact 405 of relay 406. Movable arm 407 will engage contact 405 upon energization of the reset solenoid 408 and complete the electrical path from lead 404 to lead 409. Lead 409 extends through fuse 410 and solenoid 411 of relay 412 to lead 413 which connects with line lead 402 to complete the circuit through the motor 314.

Initially, if the door is opened, the normally closed switch 301 will open and the motor cannot be energized. The arm 407 is on the contact 405 so that the dropping of suitable coins in the check-controlled mechanism may complete the circuit through switches not here shown. In any event, the arm 407 is moved onto contact 414, completing circuit from line lead 401 through conductor 415 to energize solenoid 411. Means well known may be utilized (not shown) to hold arm 407 against contact 414 as long as desired until resetting.

A safety circuit such as associated with electromagnet 416 may be provided. Electromagnet 416 may require energizing to accept coins through operating some other mechanism not shown. It is in series with lead 418 extending to line lead 402 and a normally closed thermally operated switch 419 in lead 420 which breaks the circuit if the temperature in the tank exceeds safe refrigeration value. Solenoid 416 is also in series with empty switch 422 and terminates at contact 423 of solenoid 412. Normally, arm 424 engages contact 423, and completes a connection through lead 425 and delivery switch 426, and also connects with arm 427.

The switch 422 is located on the interior of the housing 28 in the position shown in Fig. 4, in the last row of the last bank, that is row D3. It is spaced below the level of the stringer and has an upwardly biased lever or arm, which is of sufficient strength to pivot a tray upward providing there is no carton on the tray. A simple normally open microswitch can be used, so that the conductor 425 will be opened when the last carton has been dropped, moving an empty tray over the switch arm.

The switch 426 is normally closed to complete a circuit which energizes the motor 314. The switch is opened however by a suitable cam 429 when the shaft 316 has made a full revolution and conveniently is driven by that shaft in any desired manner.

When the solenoid 411 is energized, it pulls contact arm 424 to contact 430 and arm 427 to contact 431. The latter function closes circuit through lead 432 solenoid 408, lead 433 between line leads 401 and 402, energizing the solenoid and resetting vend switch relay 406 to the position shown in the figure. The former function connects motor 314 across the line, and the motor rotates until its circuit is broken by switch 426 after one revolution.

Suitable contact holding means, time delays and additional switches and relays may be used for refinement and modification of the general circuit disclosed. The only requirement is that the coin operated mechanism cause the source of power to energize the motor for one cyclic operation of its driving means.

By way of conclusion, it is again pointed out that great variation is possible in the sizes, shapes and proportions of the parts. Since the description has cumulatively included discussions as to the manner of operation of the various parts of the machine it is felt that no explanation in summarization is required. The objects and advantage of the invention are achieved through the combinations and structures set forth as claims hereinafter.

What it is desired to secure by Letters Patent of the United States is:

1. A carton carrying and dispensing device, comprising a housing, means at one end of the housing for gaining access thereto and including a delivery device, a plurality of trays movably supported in the housing arranged in endless rows having upper and lower reaches, said rows being secured to flexible driven members, the reaches being arranged substantially horizontally whereby as the driven members move, the trays move forward toward said delivery device on the top reach and rearward from said delivery device on the bottom reach, the trays being aligned transverse of the direction of movement and all moving simultaneously, means for actuating the driven members for intermittently moving the trays a predetermined distance, tripper means at the said one end, each tray having control means for cooperating with the tripper means, the tripper means serving to drop a tray from each row in a predetermined consecutive order at each movement of the flexible driven members, the dropping of a tray depositing an article carried thereon in said delivery device.

2. A carton carrying and dispensing device, comprising a housing, means at one end of the housing for gaining access thereto and including a delivery device, a plurality of trays movably supported in the housing arranged in endless rows having upper and lower reaches, said rows being secured to flexible driven members, the reaches being arranged substantially horizontally whereby as the driven members move, the trays move forward toward said delivery device on the top reach and rearward from said delivery device on the bottom reach, the trays being aligned transverse of the direction of movement and all moving simultaneously, means for actuating the driven members for intermittently moving the trays a predetermined distance, tripper means at the said one end, each tray having control means for cooperating with the tripper means, the tripper means serving to drop a tray from each row in a predetermined consecutive order at each movement of the flexible driven members, the dropping of a tray depositing an article carried thereon in said delivery device, said tripper means comprising a plurality of support members of different lengths aligned with the trays of the horizontal reaches whereby the trays are carried upon said support members and the control means thereof cooperate with said support members at different positions by virtue of the different lengths thereof.

3. A device as claimed in claim 1 in which the control means comprise lateral extensions on said trays and the tripper means comprise bearing surfaces fixed relative to the housing and aligned with said lateral extensions so that the trays move to positions off their respective upper reaches where same are supported by the extensions engaging upon the bearing surfaces, the relationship between the length of the bearing surfaces and the respective lateral extensions engaging the same being different for each row.

4. A device as claimed in claim 2 in which the control means of each tray comprises an identical laterally extending part for cooperation with a support member, the support members being spaced beyond the forward end of the reaches of each row, whereby the respective trays will move forward of their reaches and drop after the laterally extending part passes the length of its cooperating support member.

5. A device as claimed in claim 1 in which there are sheave means at the forward end of the rows and the flexible driven members pass over said sheave means in moving the trays from the top reach to the bottom reach, each tray being pivotally secured to the driven members but only at its trailing edges whereby as the trays reach the forward ends of their reaches, they may continue to move forward in horizontal disposition while that portion of the flexible driven members adjacent the trailing edges of the trays approaches the limit of forward movement on the top reach and is about to enter upon said sheave means.

6. A device as claimed in claim 1 in which there are sheave means at the forward end of the rows and the flexible driven members pass over said sheave means in moving the trays from the top reach to the bottom reach, each tray being pivotally secured to the driven members but only at its trailing edges whereby as the trays reach the forward ends of their reaches, they may continue to move forward in horizontal disposition while that portion of the flexible driven members adjacent the trailing edges of the trays approaches the limit of forward movement on the top reach and is about to enter upon said sheave means, said tripper means providing support for the leading edges of each tray at the front of each row as the leading edge moves forward beyond the sheave means but only to the extent that the front end of the tray will drop before its trailing edge moves to a level lower than that of its horizontal reach.

7. A device as claimed in claim 1 in which there are sheave means at the forward end of the rows and the flexible driven members pass over said sheave means in moving the trays from the top reach to the bottom reach, each tray being pivotally secured to the driven members but only at its trailing edges whereby as the trays reach the forward ends of their reaches, they may continue to move forward in horizontal disposition while that portion of the flexible driven members adjacent the trailing edges of the trays approaches the limit of forward movement on the top reach and is about to enter upon said sheave means, said tripper means providing support for the leading edges of each tray at the front of each row as the leading edge moves forward beyond the sheave means but only to the extent that the front end of the tray will drop before its trailing edge moves to a level lower than that of its horizontal reach, and bearing means carrying the trays of the rows while moving along their upper reaches, said bearing means being shorter than the length of said rows whereby the trays at the front end move off the bearing means supporting same and into supporting engagement with the tripper means.

8. A carton carrying and dispensing device, comprising a housing, means at one end of the housing for gaining access thereto and including a delivery device, a plurality of trays movably supported in the housing arranged in endless rows having upper and lower reaches, said rows being secured to flexible driven members, the reaches being arranged substantially horizontally whereby as the driven members move, the trays move forward toward said delivery device on the top reach and rearward from said delivery device on the bottom reach, the trays being aligned transverse of the direction of movement and all moving simultaneously, means for actuating the driven members for intermittently moving the trays a predetermined distance, tripper means at the said one end, each tray having control means for cooperating with the tripper means, the tripper means serving to drop a tray from each row in a predetermined consecutive order at each movement of the flexible driven members, the dropping of a tray depositing an article carried thereon in said delivery device, there being two of such driven members arranged to loop identically and having sheave means at each end of the respective loops, a plurality of pintles extending between the driven members and spaced along the loops and each mounting as many trays side by side as there are rows with means for maintaining the tray spacing, and the rows being formed by the identically positioned trays of each pintle.

9. A carton carrying and dispensing device, comprising a housing, means at one end of the housing for gaining access thereto and including a delivery device, a plurality of trays movably supported in the housing arranged in endless rows having upper and lower reaches, said rows being secured to flexible driven members, the reaches being arranged substantially horizontally whereby as the driven members move, the trays move forward toward said delivery device on the top reach and rearward from said delivery device on the bottom reach, the trays being aligned transverse of the direction of movement and all moving simultaneously, means for actuating the driven members for intermittently moving the trays a predetermined distance, tripper means at the said one end, each tray having control means for cooperating with the tripper means, the tripper means serving to drop a tray from each row in a predetermined consecutive order at each movement of the flexible driven members, the dropping of a tray depositing an article carried thereon in said delivery device, there being two of such driven members arranged to loop identically and having sheave means at each end of the respective loops, a plurality of pintles extending between the driven members and spaced along the loops and each mounting as many trays side by side as there are rows with means for maintaining the tray spacing, and the rows being formed by the identically positioned trays of each pintle, and means for supporting the trays while moving forward on the upper reaches of their respective rows.

10. A carton carrying and dispensing device, comprising a housing, means at one end of the housing for gaining access thereto and including a delivery device, a plurality of trays movably supported in the housing arranged in endless rows having upper and lower reaches, said rows being secured to flexible driven members, the reaches being arranged substantially horizontally whereby as the driven members move, the trays move forward toward said delivery device on the top reach and rearward from said delivery device on the bottom reach, the trays being aligned transverse of the direction of movement and all moving simultaneously, means for actuating the driven members for intermittently moving the trays a predetermined distance, tripper means at the said one end, each tray having control means for cooperating with the tripper means, the tripper means serving to drop a tray from each row in a predetermined consecutive order at each movement of the flexible driven members, the dropping of a tray depositing an article carried thereon in said delivery device, there being two of such driven members arranged to loop identically and having sheave means at each end of the respective loops, a plurality of pintles extending between the driven members and spaced along the loops and each mounting as many trays side by side as there are rows with means for maintaining the tray spacing, and the rows being formed by the identically positioned trays of each pintle, means for supporting the trays in carton carrying substantially horizontal disposition while moving forward on the upper reaches of their respective rows and means for supporting the trays in substantially horizontal disposition while moving rearward on the lower reaches of their respective rows but in upside down condition.

11. A carton carrying and dispensing device, comprising a housing, means at one end of the housing for gaining access thereto and including a delivery device, a plurality of trays movably supported in the housing arranged in endless rows having upper and lower reaches, said rows being secured to flexible driven members, the reaches being arranged substantially horizontally whereby as the driven members move, the trays move forward toward said delivery device on the top reach and rearward from said delivery device on the bottom reach, the trays being aligned transverse of the direction of movement and all moving simultaneously, means for actuating the driven members for intermittently moving the trays a predetermined distance, tripper means at the said one end, each tray having control means for cooperating with the tripper means, the tripper means serving to drop a tray from each row in a predetermined consecutive order at each movement of the flexible driven members, the dropping of a tray depositing an article carried thereon in said delivery device, there being two of such driven members arranged to loop identically and having sheave means at each end of the respective loops, a plurality of pintles extending between the driven members and spaced along the loops and each mounting as many trays side by side as there are rows with means for maintaining the tray spacing, and the rows being formed by the identically positioned trays of each pintle, the trays at the rear end of the bottom reach hanging vertically and there being flipper means rotating with said sheave means and axially aligned therewith operated by movement of said driven members for engaging said vertically hanging trays and carrying same over the rear end of the respective rows and onto the top reaches thereof in horizontal carton-carrying disposition.

12. A carton carrying and dispensing device, comprising a housing, means at one end of the housing for gaining access thereto and including a delivery device, a plurality of trays movably supported in the housing arranged in endless rows having upper and lower reaches, said rows being secured to flexible driven members, the reaches being arranged substantially horizontally whereby as the driven members move, the trays move forward toward said delivery device on the top reach and rearward from said delivery device on the bottom reach, the trays being aligned transverse of the direction of movement and all moving simultaneously, means for actuating the driven members for intermittently moving the trays a predetermined distance, tripper means at the said one end, each tray having control means for cooperating with the tripper means, the tripper means serving to drop a tray from each row in a predetermined consecutive order at each movement of the flexible driven members, the dropping of a tray depositing an article carried thereon in said delivery device, there being two of such driven members arranged to loop identically and having sheave means at each end of the respective loops, a plurality of pintles extending between the driven members and spaced along the loops and each mounting as many trays side by side as there are rows with means for maintaining the tray spacing, and the rows being formed by the identically positioned trays of each pintle, the trays at the rear end of the bottom reach hanging vertically and there being flipper means rotating with said sheave means and axially aligned therewith operated by movement of said driven members for engaging said vertically hanging trays and carrying same over the rear end of the respective rows and onto the top reaches thereof in horizontal carton-carrying disposition, comprising a disc for each row of diameter to engage the trailing edge of each tray approaching said rear end and prevent pivoting thereof as the disc rotates therewith.

13. A carton carrying and dispensing device, comprising a housing, means at one end of the housing for gaining access thereto and including a delivery device, a plurality of trays movably supported in the housing arranged in endless rows having upper and lower reaches, said rows being secured to flexible driven members, the reaches being arranged substantially horizontally whereby as the driven members move, the trays move forward toward said delivery device on the top reach and rearward from said delivery device on the bottom reach, the trays being aligned transverse of the direction of movement and all moving simultaneously, means for actuating the driven members for intermittently moving the trays a predetermined distance, tripper means at the said one end, each tray having control means for cooperating with the tripper means, the tripper means serving to drop a tray from each row in a predetermined consecutive order at each movement of the flexible driven members, the dropping of a tray depositing an article carried thereon in said delivery device, there being two of such driven members arranged to loop identically and having sheave means at each end of the respective loops, a plurality of pintles extending between the driven members and spaced along the loops and each mounting as many trays side by side as there are rows with means for maintaining the tray spacing, and the rows being formed by the identically positioned trays of each pintle, means for supporting the trays in carton carrying substantially horizontal disposition while moving forward on the upper reaches of their respective rows and means for supporting the trays in substantially horizontal disposition while moving rearward on the lower reaches of their respective rows but in upside down condition, said last mentioned supporting means including a downslanted guide at the forward end thereof to engage the trailing edges of trays coming around and down from the upper reaches of the respective rows and lift the same upon said last mentioned supporting means.

14. A carton carrying and dispensing device, comprising a housing, means at one end of the housing for gaining access thereto and including a delivery device, a plurality of trays movably supported in the housing arranged in endless rows having upper and lower reaches, said rows being secured to flexible driven members, the reaches being arranged substantially horizontally whereby as the driven members move, the trays move forward toward said delivery device on the top reach and rearward from said delivery device on the bottom reach, the trays being aligned transverse of the direction of movement and all moving simultaneously, means for actuating the driven members for intermittently moving the trays a predetermined distance, tripper means at the said one end, each tray having control means for cooperating with the tripper means, the tripper means serving to drop a tray from each row in a predetermined consecutive order at each movement of the flexible driven members, the dropping of a tray depositing an article carried thereon in said delivery device, said access means comprising a pivoted door at the front end of the said housing and means normally holding the door closed and locked, means for unlocking the door, and said delivery device comprising a trough in the top of the door and normally on the interior of the housing arranged to receive the dispensed carton so that when the door is unlocked and pivoted open, it will carry the trough outside of the housing and expose the same.

15. A carton carrying and dispensing machine, comprising a housing adapted to be refrigerated, and having a pivotal door at one end thereof for gaining access thereto, a carton receiving trough in the door and normally on the interior of the housing, but adapted to be exposed when said door is pivoted outward of the housing, a supporting framework suspended in the housing and having transverse shafts journalled thereon front and rear, the front shaft being spaced rearwardly of the trough, sheave means secured on the shafts in front to rear alignment and having at least two spaced apart parallel endless flexible driven members looped about said sheave means, power driven actuating means, a cyclic control device for operating the actuating means when desired, a kinematic connection between actuating means and the flexible driven members whereby each cycle will result in the driven members being moved a relatively short distance, the top of each loop being horizontal and moving forward toward each trough while the bottom of each loop is also horizontal and moves rearward, a plurality of side by side endless looped rows of transversely aligned trays pivotally secured at their trailing edges to said driven members and arranged to have the trays disposed horizontally for carrying cartons thereon while moving forward on the upper reaches of each row, slide bearing supports for each row secured to said framework and extending substantially the length of the upper reaches of the rows for maintaining the rows horizontally on their upper reaches, each tray adapted to move forward and off its slide bearing support and pivot forwardly and downwardly to drop its carton into said trough on a particular movement of said driven members, support means provided at the front end of the machine and above the trough cooperating with the trays to drop the end trays across all rows consecutively in consecutive cycles and hence consecutive movements of the driven member, said trays having extensions making engagement with the support means to a different extent for each row whereby the tray is maintained horizontal a substantial distance forward of the front shaft to carry the same over the trough prior to dropping its carton therein.

16. A carton carrying and dispensing machine, comprising a housing adapted to be refrigerated, and having a pivotal door at one end thereof for gaining access thereto, a carton receiving trough in the door and normally on the interior of the housing, but adapted to be exposed when said door is pivoted outward of the housing, a supporting framework suspended in the housing and having transverse shafts journalled thereon front and rear, the front shaft being spaced rearwardly of the trough, sheave means secured on the shafts in front to rear alignment and having at least two spaced apart parallel endless flexible driven members looped about said sheave means, power driven actuating means, a cyclic control device for operating the actuating means when desired, a kinematic connection between actuating means and the flexible driven members whereby each cycle will result in the driven members being moved a relatively short distance, the top of each loop being horizontal and moving forward toward each trough while the bottom of each loop is also horizontal and moves rearward, a plurality of side by side endless looped rows of transversely aligned trays pivotally secured at their trailing edges to said driven members and arranged to have the trays disposed horizontally for carrying cartons thereon while moving forward on the upper reaches of each row, slide bearing supports for each row secured to said framework and extending substantially the length of the upper reaches of the rows for maintaining the rows horizontally on their upper reaches, each tray adapted to move forward and off its slide bearing support and pivot forwardly and downwardly to drop its carton into said trough on a particular movement of said driven members, support means provided at the front end of the machine and above the trough cooperating with the trays to drop the end trays across all rows consecutively in consecutive cycles and hence consecutive movements of the driven member, said trays having extensions making engagement with the support means to a different extent for each row whereby the tray is maintained horizontal a substantial distance forward of the front shaft to carry the same over the trough prior to dropping its carton therein, the support means comprising feet of different lengths, and the extensions of the trays being lateral thereto and each identical and aligned transversely whereby notwithstanding a transverse group of trays reaches the end of the upper reaches thereof at the same time, each tray of said group drops at a different time.

17. A carton carrying and dispensing machine, comprising a housing adapted to be refrigerated, and having a pivotal door at one end thereof for gaining access thereto, a carton receiving trough in the door and normally on the interior of the housing, but adapted to be exposed when said door is pivoted outward of the housing, a supporting framework suspended in the housing and having transverse shafts journalled thereon front and rear, the front shaft being spaced rearwardly of the trough, sheave means secured on the shafts in front to rear alignment and having at least two spaced apart parallel endless flexible driven members looped about said sheave means, power driven actuating means, a cyclic control device for operating the actuating means when desired, a kinematic connection between actuating means and the flexible driven members whereby each cycle will result in the driven members being moved a relatively short distance, the top of each loop being horizontal and moving forward toward each trough while the bottom of each loop is also horizontal and moves rearward, a plurality of side by side endless looped rows of transversely aligned trays pivotally secured at their trailing edges to said driven members and arranged to have the trays disposed horizontally for carrying cartons thereon while moving forward on the upper reaches of each row, slide bearing supports for each row secured to said framework and extending substantially the length of the upper reaches of the rows for maintaining the rows horizontally on their upper reaches, each tray adapted to move forward and off its slide bearing support and pivot forwardly and downwardly to drop its carton into said trough on a particular movement of said driven members, support means provided at the front end of the machine and above the trough cooperating with the trays to drop the end trays across all rows consecutively in consecutive cycles and hence consecutive movements of the driven member, said trays having extensions making engagement with the support means to a different extent for each row whereby the tray is maintained horizontal a substantial distance forward of the front shaft to carry the same over the trough prior to dropping its carton therein, the support means comprising feet of different lengths, and the extensions of the trays being lateral thereto and each identical and aligned transversely whereby notwithstanding a transverse group of trays reaches the end of the upper reaches thereof at the same time, each tray of said group drops at a different time, the row whose support foot is the shortest dropping its tray first followed consecutively by the trays from the rows whose support feet are consecutively longer.

18. A carton carrying and dispensing machine, comprising a housing having means at its front end for gaining access thereto and a delivery device at said front end, means supporting a plurality of endless rows of carton-supporting trays for movement in loops along upper reaches substantially horizontally and forward toward said delivery device and along lower reaches rearwardly, endless belt means having the trays pivotally secured thereto and moving in identical loops, all trays and belt means coupled to move simultaneously, cyclic means for driving the belt means a predetermined distance, means energizing and operating said cyclic means one or more times as desired, there being a plurality of banks of rows, each bank having the same number of rows, the trays of the rows of each bank being transversely aligned within the bank, but the banks being spaced from one another along the line of movement thereof so that the transversely aligned groups of trays of the respective banks reach the front end of their upper reaches at different times, tripper means at the said front end and adapted to cooperate with the trays to carry the leading trays of each row slightly beyond the front end of its loop and over said delivery device and thereafter drop the same to deposit the carton on said tray in said delivery device, the said pivotal attachment of each tray being on its rear edge, the tripper means being constructed to drop the trays of each bank at different times, and all before the transversely aligned leading trays of the rows of the next bank arrive at the front end of their reaches and commence to drop.

19. A machine as claimed in claim 18 in which each tray has a lateral extension and the tripper means comprise a support member for each row aligned therewith and with the extensions of the trays of that row, the trays being carried forward from their respective reaches onto the tripper support members, the length of engagement between tripper support member and the engaged extension being proportional to the amount of forward movement required before said tray is no longer supported.

20. A machine as claimed in claim 18 in which each tray has a lateral extension and the tripper means comprise a support member for each row aligned therewith and with the extensions of the trays of that row, the trays being carried forward from their respective reaches onto the tripper support members, the length of engagement between tripper support member and the engaged extension being proportional to the amount of forward movement required before said tray is no longer supported, the tripper support members of the rows of any bank being of different length whereby the end trays will drop at different times on consecutive movements of the belt means.

21. A machine as claimed in claim 1 in which the distance along each row in the direction of movement between identical points of a pair of consecutive trays is equal to the distance moved by all trays in one movement of the actuation means multiplied by the total number of rows.

22. A machine as claimed in claim 18 in which the distance along each row in the direction of movement between identical points of a pair of respective trays is equal to the distance moved by all trays in one operation of the cyclic means multiplied by the number of rows, and the number of banks is a whole number divisible into the total number of rows so that there are an equal number of rows in each bank.

23. A machine as claimed in claim 22 in which the trays each have an identical lateral extension and the tripper means comprise tripper feet, there being one foot for each row aligned with the extensions while the trays are moving forwardly and horizontally so that each tray moves onto a foot after passing the front of its upper reach, the feet aligned with the rows of each bank being of different length to drop the trays of the bank at different times.

24. A machine as claimed in claim 22 in which the trays each have an identical lateral extension and the tripper means comprise tripper feet, there being one foot for each row aligned with the extensions while the trays are moving forwardly and horizontally so that each tray moves onto a foot after passing the front of its upper reach, the feet aligned with the rows of each bank being of different length to drop the trays of the bank at different times, but the feet of each bank being substantially the same from bank to bank while being different from one another within the bank.

25. A machine as claimed in claim 18 in which the means for supporting the trays includes a framework suspended in the housing and having front and rear shafts mounting sheave means, said belt means being engaged over said sheave means, an upper plate carrier assembly providing bearing surfaces supporting said trays slidably while said trays are moving forward on their upper reaches, and flipper means mounted for rotation with the rear shaft of said framework for righting the trays moving from the end of bottom reaches of rows to their respective top reaches.

26. A machine as claimed in claim 18 in which the means for supporting the trays includes a framework suspended in the housing and having front and rear shafts mounting sheave means, said belt means being engaged over said sheave means, an upper plate carrier assembly providing bearing surfaces supporting said trays slidably while said trays are moving forward on their upper reaches, and flipper means mounted for rotation with the rear shaft of said framework for righting the trays moving from the end of bottom reaches of rows to their respective top reaches, comprising a wheel aligned with each row of diameter to engage the trailing edges of down-hanging trays and prevent pivoting of the trays while rotating about the ends of their loops.

27. A machine as claimed in claim 18 in which the means for supporting the trays comprises a rectangular framework having elongate rigid side members, a front shaft connecting the front ends of the side members and a rear shaft connecting the rear ends of the side members, the shafts being journalled for rotation and having wheels aligned front and rear for engaging with the said belt means, a tray support assembly secured to the side members and arranged horizontally to provide slide bearings for the respective rows of trays in their forward movement, the trays moving rearward on their bottom reach hanging down at least adjacent the ends of their bottom reaches, means mounted on the rear shaft for righting the trays as they pass around their loops to the top reach.

28. A machine as claimed in claim 18 in which the means for supporting the trays comprises a rectangular framework having elongate rigid side members, a front shaft connecting the front ends of the side members and a rear shaft connecting the rear ends of the side members, the shafts being journalled for rotation and having wheels aligned front and rear for engaging with the said belt means, a tray support assembly secured to the side members and arranged horizontally to provide slide bearings for the respective rows of trays in their forward movement, the trays moving rearward on their bottom reach hanging down at least adjacent the ends of their bottom reaches, means mounted on the rear shaft for righting the trays as they pass around their loops to the top reach, said tripper means comprising lateral feet, one foot for each row, and each tray having an extension to cooperate with the foot of its row, and means supporting said feet in spaced relation one to the other, in spaced relation to said framework, and in proper spaced relation to said delivery device so that the dropping of a tray will result in the delivery of a carton to said delivery device.

29. A machine as claimed in claim 27 in which the tripper means includes stop members for limiting forward tilting of cartons falling off trays.

30. A machine as claimed in claim 28 in which said tripper means is attached to the said rectangular framework and the said framework is removably suspended in said housing whereby the entire framework with trays, supports, shafts, flipper means and tripper means may be removed as a unit.

31. A machine as claimed in claim 28 in which the cyclic means comprises an actuating bar, a motor, a kinematic connection between bar and motor so that the rotation of the motor will be transformed into rectilinear movement of a part of the bar, means providing engagement between said part of the bar and said belt means but only when the bar moves in one predetermined direction.

32. A machine as claimed in claim 28 in which the cyclic means comprises an actuating bar, a motor, a kinematic connection between bar and motor so that the rotation of the motor will be transformed into rectilinear movement of a part of the bar, means providing engagement between said part of the bar and said belt means but only when the bar moves in one predetermined direction, said cyclic means also being secured to said framework and removable therewith.

33. A machine as claimed in claim 1 in which the actuating means comprises a source of rotating power, an eccentric rotated by the source and making a single revolution for each energization of the source, a rocking bar having one end secured to the eccentric and having an opening engaging tooth at the other end, one flexible driven member having spaced openings therein along the lengths thereof, the rocking bar being slidably and pivotally mounted in the center thereof whereby for each rotation of the eccentric, the tooth will enter an opening of the driven member, translate the same a predetermined distance and then withdraw therefrom and return to its original position.

34. A machine as claimed in claim 18 in which storage space is provided in the housing below the lower reach of the rows of trays, means are provided for supporting the trays moving rearward on the lower reaches of the rows in horizontal but upside down condition.

35. A machine as described in claim 34 in which means are provided to lift the trays onto said last mentioned support means after dropping their respective cartons.

36. A machine of the character claimed in claim 18 in which the belt means comprise sprocket chains, there being a chain alongside each bank, but the inside banks having common chains, and said support means including front and rear shafts having sprocket wheels engaged with the respective chains, there being a plurality of shafts extending between chains along the lengths of the chains and the trailing edges of the trays having journals engaged upon the shafts and spaced one from the other to maintain their respective row positions.

37. A machine as described in claim 36 in which, the cyclic driving means includes a motor actuated rocking bar pivotally and slidably mounted between its ends, means for eccentrically rotating one end, and a tooth provided at the opposite end disposed to enter between links of a chain on half of its rocking movement to translate the chain, and withdrawing from the chain on the other half of its movement.

38. A machine as described in claim 18 in which the means for energizing and operating the cyclic means includes a source of electrical power and an electric motor in circuit therewith, check-operated means for closing the circuit, and switch means disposed beneath one row of trays and keeping the circuit closed so long as a weight maintains the trays passing thereover horizontally, but said switch means including an upwardly biased arm serving to lift itself and open the circuit in the event a tray without a weight thereon passes thereover, said arm pivoting said weightless tray upward and signifying that the machine is empty.

39. In a device of the character described in which there is a housing having a plurality of forwardly moving trays therein, said trays being arranged in rows arranged between the side walls of the housing and adapted to move parallel with said side walls in carrying cartons toward the front of the housing, the rows comprising endless loops of pivoted trays each supporting a carton and there being a driving mechanism for moving the trays forward to the front ends of their respective reaches whereby to tip downward at their front reaches and drop their respective cartons, a front wall extending across the housing and having a trough therein longer than the total width of the side by side rows, the cartons adapted to be tipped into the said trough, the trough being normally on the interior of the housing when the wall is in erect position, and the wall being pivotally mounted so that same may be pulled forward carrying the trough with it to expose the same on the exterior of the housing.

No references cited.